United States Patent [19]
Elsner, deceased et al.

[11] 3,889,526
[45] June 17, 1975

[54] MECHANISM FOR INDICATING LOAD TENSION ON A FASTENING DEVICE

[75] Inventors: Edwin C. Elsner, deceased, late of Kanosh, Utah; Viola Hazel Elsner, executrix, Kanosh, Utah

[73] Assignees: Max Fink; Floyd G. Hahn, both of Beverly Hills, Calif. ; part interest to each

[22] Filed: Oct. 23, 1973

[21] Appl. No.: 408,399

[52] U.S. Cl. ................................................ 73/88 F
[51] Int. Cl. ........................ G01d 21/00; G01b 5/08
[58] Field of Search ........................... 73/88 F, 88 E; 116/DIG. 34

[56] References Cited
UNITED STATES PATENTS
3,383,961   5/1968   Dahl................................. 73/88 F Primary Examiner—James J. Gill
Assistant Examiner—Anthony V. Ciarlante
Attorney, Agent, or Firm—Whann and McManigal

[57] ABSTRACT

An improved mechanism for positively indicating load tension forces on a threaded fastening device, such as a stud or bolt, in response to the radial expansion of an associated annular member under increasing applied load tension forces in the fastening device, the mechanism being operatively attachably associated with the fastening device and including a movable sensing member engageable by the expanding annular member and being operable to activate visible indicating means. Provision is also made for selectively including in the mechanism an interchangeable mechanical indicator unit or an electrical indicator unit, depending upon the type of visual indication desired.

15 Claims, 4 Drawing Figures

PATENTED JUN 17 1975    3,889,526

MECHANISM FOR INDICATING LOAD TENSION ON A FASTENING DEVICE

BACKGROUND OF THE INVENTION

The present invention relates generally to mechanisms for indicating the residual load tension forces set up in a fastening device.

Heretofore, devices for controlling and indicating residual load tension forces in studs, bolts, or the like, have been known generaly from U.S. Pat. No. 3,405,597 which discloses the use of either visual means in which concentric rings of different colors on an expandable washer serve as an indicator, or in which a feeler gauge is used to measure the washer expansion. In those devices involving the use of the concentric rings of different colors, an operator must repeatedly bend over the device and watch carefully for the color changes during tightening of the fastening means. Such a procedure is inconvenient and the color changes are not always readily discernable.

In those devices using a feeler gauge, such as a ring gauge, an operator must test repeatedly the radial expansion of the expandable washer during tightening of the fastening means, until the required expansion for the proper tension force in the fastener is obtained. This procedure is also inconvenient and is not always as precise as it should be.

The present invention embodies improvements over the heretofore noted known arrangements by providing a mechanism which will automatically positively indicate when the expandable washer reaches a condition of expansion corresponding to the desired and appropriate tension force for the particular associated fastening device, and which is not dependent upon the personal judgment of an operator.

A further improvement resides in the provision of interchangeable indicating units, whereby the mechanism may be selectively adapted to provide either a mechanically visible indication or an electrically visible indication.

SUMMARY OF THE INVENTION

The present invention relates generally to mechanisms for indicating the residual load tension forces set up in a fastening device, and is more particularly concerned with a mechanism which will automatically provide a positive visible indication of such forces.

It is one object of the present invention to provide a unique mechanism for positively indicating the correct tension in a fastening device, which is more convenient to use than those previously known, and which is not dependant upon the personal judgement of the user.

A further object is to provide a mechanism according to the foregoing object, in which the indications are of visible character.

Another object of the present invention is to provide a mechanism of the character described in which interchangeable unit inserts are selectable to provide either a mechanical visual indication or an electrical visual indication.

Still another object is to provide a mechanism for indicating tension forces in a fastening device, which is magnetically removably attachable and held in an operative position with respect to the fastening device.

Other objects and advantages of the present invention will become apparent from a consideration of the following detailed portion of the specification taken in conjunction with the appended drawing in which like numerals indicate like parts throughout the several views.

DESCRIPTION OF THE PREFERRED EMBODIMENT

Figure 1:
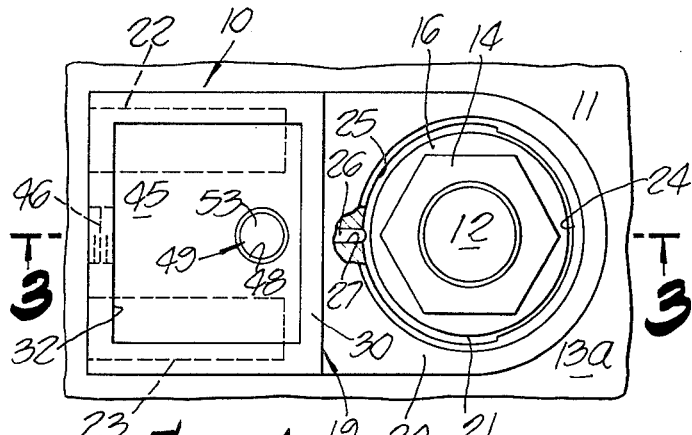
FIG. 1 is a top plan view of improved tension indicating mechanism according to the present invention, and showing its operative association with a nut and bolt fastening device, certain portions being broken away for clarity.

Referring now generally to the drawings, the mechanism as generally indicated at 10 of the present invention is arranged to be utilized with fastening means as generally indicated at 11, the fastening means being substantially of the character disclosed in U.S. Pat. No. 3,405,597. Briefly, the fastening means of this patent comprises a threaded bolt or stud 12 which is utilized, for example, to secure a workpiece which may comprise a single structural member or, as shown, may comprise a plurality of plates 13a, 13b or the like, which are to be secured in position by the bolt or stud 12 and an associated nut 14.

In order for the fastening device to properly and efficiently function, it is necessary to provide means for accurately determining the residual loading tension on the bolt. As a measure of these residual load tension forces in the bolt, it is known from the patent to provide annular means, as generally indicated at 15, which are positioned between an end face of the nut and the upper seating surface of the plate 13a. The annular means 15 contains parts that coact under the load tension forces during tightening of the nut to radially expand the annular means in a manner hereinafter explained in detail. By sensing this radial expansion it is possible to readily ascertain when the load tension forces reach a predetermined desired value. More specifically, the annular means comprises an upper washer 16 and an underlying washer 17. These washers are in confronting relation and are spaced apart by means of a concentric projection 18 in the form of a circular wedge. The washer 17 is fabricated from a relatively hard material, while the washer 16 is relatively softer. Upon tightening of the nut 14, the washers 16 and 17 will be axially forced together, and as the compressive forces are increased, and the concomitant tension in the bolt or stud 12 increased accordingly, the circular wedge formed by the projection 18 will be forced into the confronting surface of the washer 16 so as to place the outer periphery of the washer 16 under "hoop tension forces" which cause a radial expansion of the washer 16. The increase in diameter of the washer 16 serves as a measure of the tension forces which are being set up in the stud or bolt 12, and it is the purpose of the present invention to positively sense and indicate when the diameter of the washer 16 reaches a value corresponding to the desired tension forces in the fastening device.

Figure 2:
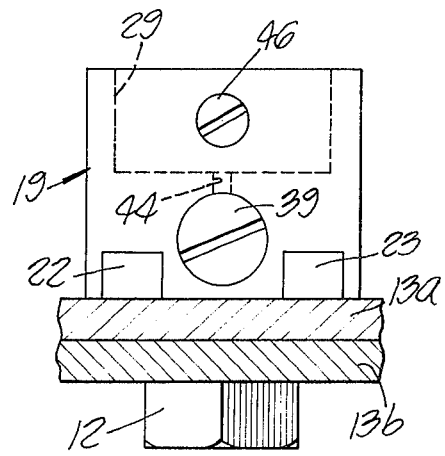
FIG. 2 is a side elevational view, partly in section, of the mechanism of FIG. 1.
Figure 3:
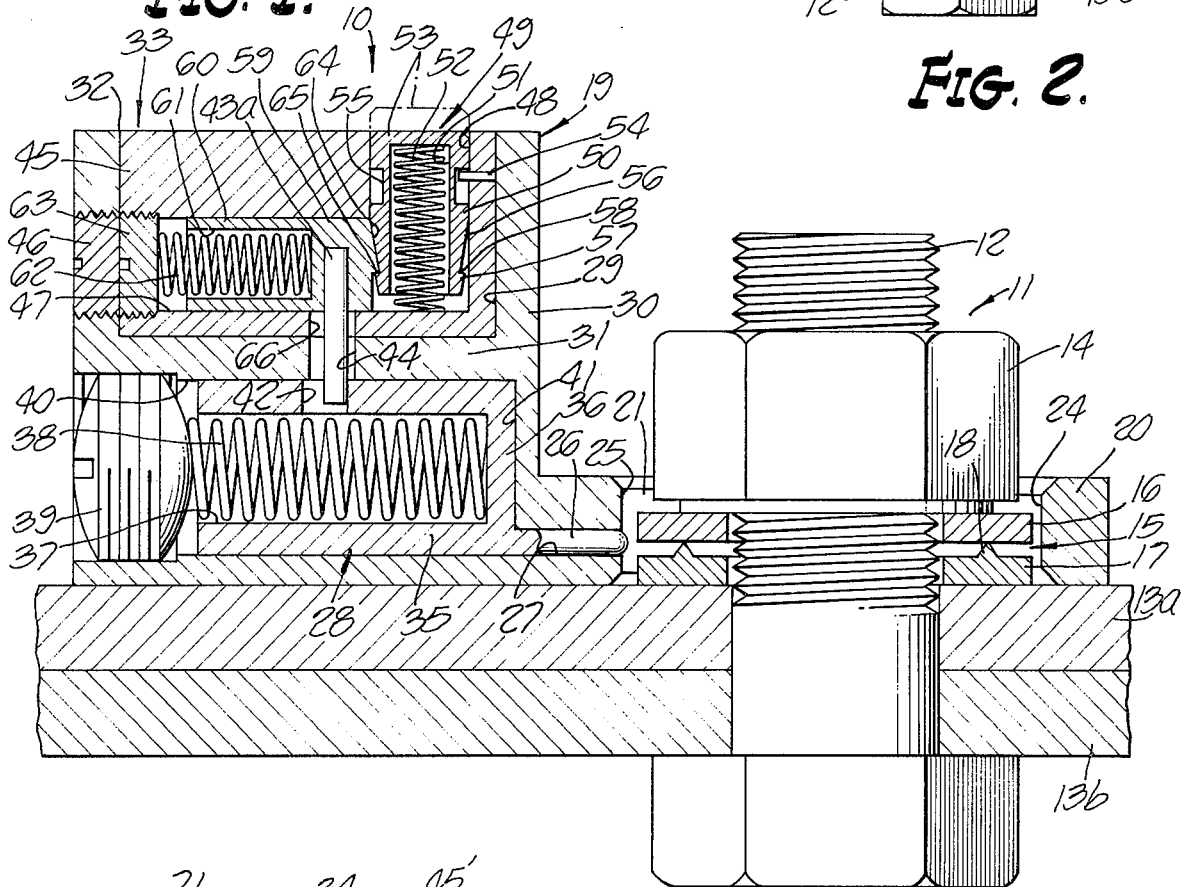
FIG. 3 is an enlarged sectional view, taken substantially on line 3—3 of FIG. 1, and showing details of the associated mechanically indicating insert unit.

As best shown in FIG. 3, the mechanism of the present invention is operatively arranged in an upstanding hollow body as generally indicated at 19, this body having a laterally extending bottom projection 20 formed with an opening 21 to enable the hollow body to be mounted on the upper surface of the plate 13a with the fastening device and washers 16 and 17 axially positioned therein. Provision is made for releasably attaching the mechanism in an operative position on the plate 13a, and for this purpose magnets 22 and 23 have been mounted at the base of the upstanding hollow body 19, as shown in FIGS. 1 and 2. These magnets operate to retain the mechanism in a mounted position against the plate 13a, yet permit slight lateral shifting on the plate during use to accommodate the opening 21 with respect to the washers 16 and 17 therein.

Preferably, the opening 21 is formed by a first arcuate wall portion 24 and a second arcuate wall portion 25 which are disposed on opposite sides of the opening. As will be seen, the wall portions 24 and 25 are joined at their ends, and that these wall portions are radially offset at their joined ends, the wall portion 24 having a lesser radius than the wall portion 25. Moreover, the wall portion 24 preferably extends over an angle of 150° while the wall portion 25 extends over and angle of 210°. At the midlength of the wall portion 25, a movable sensing member 26 is supported within a bore 27 so as to project radially within the opening 21 and with its end disposed in proximity to the periphery of the washer 16 at one side of its diameter. As thus arranged, it will be apparent that, when the washer 16 radially expands, as the nut 14 is tightened, the end of the sensing member 26 will be engaged on one side of the washer 16, and the wall portion 24 will engage the other side of the washer 16. This engagement and movement of the sensing member 26 is so arranged that movement of the sensing member will occur when the tension forces in the stud or bolt are at the desired value. The wall portions 24 and 25 are radially offset so as to facilitate removal of the mechanism from its mounted position during engagement of the washer 16 with the sensing member 26. Movement of the sensing member functions to actuate associated sensing means 28 which will be described subsequently.

As shown in FIG. 3, the body 19 is of generally rectangular configuration, and is molded or otherwise fabricated to provide an upper generally rectangular cavity 29 formed by a side wall 30 which extends upwardly from a bottom wall 31 to an open upper end 32.

Figure 4:
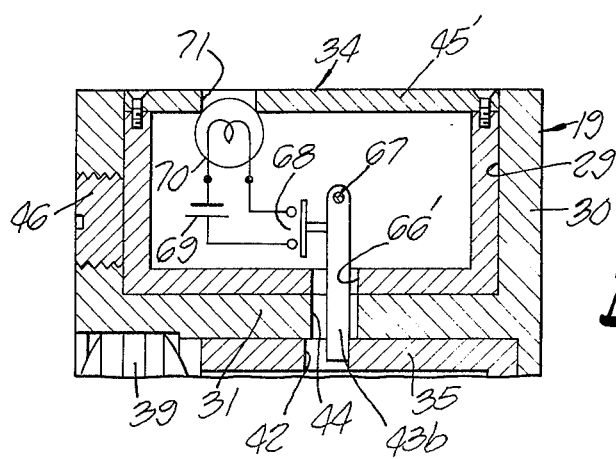
FIG. 4 is a fragmentary sectional view showing details of an associated interchangeable electrically indicating insert unit, portions being schematically disclosed.

The cavity 29 is arranged to interchangeably receive a mechanical visual indicating unit 33 as shown in FIG. 3, or an electric visual indicating unit 34 as shown in FIG. 4.

The sensing means 28 provides a common actuator for either the mechanical indicating unit or the electrical indicating unit and comprises a cylindrical plunger 35 which is closed at one end by a bottom wall 36 and is open at its opposite end, as indicated at 37, to receive endwise therein a compression spring 38 which bears at one end against the bottom wall 36 and at its opposite end against a retaining screw member 39 having threaded engagement with the open end of a cylindrical bore 40 within which the plunger 35 is axially slidable. The bottom wall 36 of the plunger is integrally connected with the movable sensing member 26, and the spring 38 normally urges the plunger inwardly to a stop position in which the bottom wall 36 engages a bottom wall 41 of the cylindrical bore 40.

The cylindrical plunger 35 is formed with a wall opening 42 which is adapted to receive the lower end portion of a trigger member 43a of the mechanical indicating unit or trigger member 43b of the electrical indicating unit to provide a one-way motion transmitting connection with the sensing means 28, the trigger member in each case being arranged to extend through an opening 44 in the bottom wall 31.

As shown in FIG. 3, the mechanical visual indicating unit 33 comprises a housing body 45 having an external configuration conforming to that of the upper cavity 29 so that the housing body may be inserted through the open upper end 32 into the cavity 29 where it may be securely anchored by means of a set screw 46 in the side wall 30. The body is fabricated to provide intersecting horizontal and vertical internal cylindrical bores 47 and 48, respectively. The bore 48 slidably mounts a mechanical indicating member 49 in the form of a plunger having an annular wall 50 defining an internal bore 51 containing a compression spring 52 having its outer end bearing against a wall 53 at the upper end of the bore, and its other end bearing against an inner end of the bore 48. The indicating member is normally urged by the spring 52 from a depressed non-indicating position as shown in full lines in FIG. 3 to a projecting indicating position as shown in phantom lines. A stop pin 54 supported in the housing body has an inner end extending into a circumferentially extending groove 55 formed in the annular wall 50, whereby the movement of the indicating member is limited at its non-indicating and indicating positions. As thus arranged, the top wall 53 forms a visible indicating button. The inner end portion of the annular wall has an outer surface 56 which is downwardly tapered towards an end flange 57 with which it coacts to form a latching shoulder 58.

The horizontal bore 47 slidably mounts a latching plunger 59 having one end formed with an annular wall 60 which surrounds an internal bore 61 for receiving one end of a compression spring 62, the other end of this spring being engaged with a retaining screw member 63 having threaded engagement with the open end of the bore 47. The innermost end of the latching plunger 59 is formed with a bevelled camming end surface 64 which terminates in a latching shoulder 65 adapted to coact with the latching shoulder 58, when the indicating member 49 is depressed to its non-indicating position. It will be observed that during this depressing movement, the flange 57 will bear against the camming surface 64 and move the latching plunger 59 towards the left so as to permit passage of the indicating member to its depressed latched position. It will be noted that the trigger member 43a is fixedly secured to the latching plunger 59 and extends outwardly through an opening 66 having registration with the opening 44.

From the foregoing description, it will be appreciated that, when the mechanical indicating member 49 is in its non-indicating depressed position as shown in FIG. 3, and latched in this position by the latching plunger 59, the required radial expansion of the washer 16 upon reaching the appropriate load tension force in the fastening device will cause the periphery of the washer to engage the movable sensing member 26 and shift the cylindrical plunger 35 so as to move the trigger member 43a and release the latch plunger 59. Upon release of the latch plunger, the mechanical indicating means 49 will snap upwardly to its indicating position and thus provide a positive visual indication to the operator and show that the required tension forces have been obtained in the fastening device. To re-set the indicating mechanism for use with the next fastening device, it is only necessary to depress the indicating member 49 so as to return it to its latched position.

As shown in FIG. 4, the electrical visual indicating unit 34 is contained in a housing body 45' which is interchangeable with the housing body 45 in the upper cavity 29. In this embodiment, the trigger member 43b extends through an opening 66' and the opening 44 into opening 42 in the cylindrical plunger 35. In this case, the trigger member 43b is mounted for swinging movement on a suitable pivot 67. In this unit, swinging movement of the trigger member 43b in response to movement of the sensing member 26 operates to close the normally open contacts of a switch 68. Closure of the switch 68 completes an energizing circuit from a battery 69 to an indicating electric lamp 70 which will provide a visible indication through an associated opening 71 of the housing body 45'. Removal of the mechanism from its operative position with the associated fastening device, will permit return of the cylindrical plunger 35 to its normal position by means of the spring 38. In this position, the contacts 68 will automatically resume their open position and open the energizing circuit to the lamp 70. Thus, in this embodiment of the mechanism, the lamp 70 produces a positive visual indication when the tension forces in the fastening device are increased to the proper and desired value.

From the foregoing description and drawings, it will be clearly evident that the delineated objects and features of the invention will be accomplished.

Various modifications may suggest themselves to those skilled in the art without departing from the spirit of the disclosed invention, and, hence, I do not wish to be restricted to the specific forms shown or uses mentioned, except to the extent indicated in the appended claims.

I claim:

1. Mechanism for indicating the load tension force applied to a threaded member during tightening and setting up of an associated nut, and in which the load tension is effective to radially expand an annular member as a function of the load tension forces, said mechanism comprising a hollow body having an integral, laterally extending projection on one side thereof of reduced height relative to the body, said projection having an opening therethrough defining an inner annular wall, said opening having a size such as to receive the nut and the annular member therein and the height of the projection being such that at least a portion of the nut received in said opening is exposed above said projection for engagement with a suitable tool, sensing means in said hollow body including a movable elongate sensing member extending through an opening in said wall into said opening at one side of said annular member and engagable by and axially movable in response to radial expansion of the annular member, and visual indicating means carried by said body and operatively connected with said sensing member to be activated in response to movement of said sensing member.

2. Mechanism according to claim 1, including magnetic means for removably attaching said body in an operative position with the annular member positioned in said opening.

3. Mechanism according to claim 1, wherein the visual indicating means includes selectable interchangeable indicating unit inserts each adapted for activation in response to movement of said sensing member, one of said units having means providing a mechanical visual indication and the other having means providing an electrical visual indication.

4. Mechanism according to claim 1, wherein said annular wall includes a first portion engageable with one side of said annular member and a second portion spaced from the opposite side of said annular member, the first and second wall portions being arcuate and coaxial, and the second wall having a greater radius than the first wall.

5. Mechanism according to claim 1, wherein said annular wall includes a first portion engageable with one side of said annular member and a second portion spaced from the opposite side of said annular member, the first and second wall portions being joined to form a generally circular opening.

6. Mechanism according to claim 1, wherein the indicating means comprises an electric lamp having an energizing circuit; normally open switch means operable in a closed position to connect the lamp with a power source; and trigger means for closing said switch responsive to movement of said sensing member.

7. Mechanism according to claim 5, wherein the second wall portion is radially outwardly offset with respect to the first wall portion.

8. Mechanism according to claim 7, in which the second wall portion longitudinally extends over a greater angle than the first wall portion.

9. Mechanism according to claim 8, wherein the angular extent of the second wall portion is greater than 180° and the extent of the first wall portion is less than 180°.

10. Mechanism according to claim 8, wherein the angular extent of the second wall portion is substantially 210° and the angular extent of the first wall portion is substantially 150°.

11. Mechanism for indicating the load tension force applied to a threaded member during tightening and setting up of an associated nut, and in which the load tension is effective to radially expand an annular member as a function of the load tension forces, said mechanism comprising:

a. a hollow body structure adapted for mounting in fixed non-rotatable relation with respect to said nut, said structure including a laterally extending projection having an opening for axially receiving the nut and the annular member therein in the mounted position of said structure, said opening having a wall with a first portion engageable with one side of said annular member and a second portion spaced from the opposite side of said annular member;

b. sensing means housed in said hollow body including a movable elongate sensing member extending through said wall into said opening at said opposite side of said annular member, said sensing member being engageable by and axially movable in response to radial expansion of the annular member; and c. visual indicating means carried by said body structure activated in response to the movement of said sensing member, said indicating means comprising a movable indicating member normally urged from a depressed non-indicating position to a raised indicating position, means for releasably latching the indicating member in its non-indicating position, and trigger means for releasing the latching means responsive to movement of said sensing member.

12. Mechanism according to claim 11, wherein the indicating member comprises a vertically extending plunger supported for limited axial movements between said depressed position and said raised position; spring means normally urging said plunger towards said raised position; and said plunger at its innermost end having a latching shoulder adapted in said depressed position of the plunger to be releasably engaged by said latching means.

13. Mechanism according to claim 11, wherein the latching means comprises a slidably mounted plunger supported for limited axial movements in right-angled relation to said indicating member between a latching position and a non-latching position with respect to said indicating member; said plunger having a latching shoulder at one end for releasably engaging said indicating member in its depressed position; and spring means normally urging said latching plunger towards its latching position.

14. Mechanism according to claim 13, wherein said trigger means provides a one-way motion transmitting connection between said sensing member and said latching plunger and includes a trigger member carried by and movable with said latching plunger.

15. Mechanism according to claim 11, wherein said sensing means comprises a plunger supported below said latching means for limited axial movements in right-angled relation to said indicating member; said sensing member being integrally connected with one end of said plunger; and spring means normally urging said plunger in a direction towards the opening in said projection.

* * * * *